United States Patent
Morrison

[11] Patent Number: 5,900,915
[45] Date of Patent: May 4, 1999

[54] HD TO SD GUIDE CONVERTER FOR ELECTRONIC TELEVISION SCHEDULE SYSTEM

[75] Inventor: Hugh Boyd Morrison, Indianapolis, Ind.

[73] Assignee: Thomson Consumer Electronics, Inc., Indianapolis, Ind.

[21] Appl. No.: 08/828,168

[22] Filed: Mar. 18, 1997

[51] Int. Cl.⁶ .............................. H04N 7/10; H04N 5/46
[52] U.S. Cl. ..................... 348/555; 348/906; 348/432; 348/6; 345/327
[58] Field of Search ................................... 348/906, 554, 348/555, 558, 426, 432; 345/145, 146, 352, 353, 326, 327

[56] References Cited

U.S. PATENT DOCUMENTS

| | | | |
|---|---|---|---|
| 4,620,218 | 10/1986 | D'Amato et al. ...................... | 348/389 |
| 4,888,641 | 12/1989 | Ismardi et al. ......................... | 348/389 |
| 4,903,125 | 2/1990 | Parker .................................... | 348/432 |
| 4,965,661 | 10/1990 | Lucas ..................................... | 348/389 |
| 5,353,121 | 10/1994 | Young et al. ........................... | 348/563 |
| 5,461,427 | 10/1995 | Duffield et al. ........................ | 348/555 |
| 5,479,266 | 12/1995 | Young et al. ........................... | 358/335 |
| 5,479,268 | 12/1995 | Young et al. ........................... | 358/335 |
| 5,623,613 | 4/1997 | Rowe et al. ............................ | 345/353 |
| 5,635,978 | 6/1997 | Alten et al. ............................. | 348/7 |
| 5,721,847 | 2/1998 | Johnson ................................. | 345/326 |
| 5,731,844 | 3/1998 | Rauch et al. ........................... | 345/326 |

FOREIGN PATENT DOCUMENTS

| | | | |
|---|---|---|---|
| 0693854 | 1/1996 | European Pat. Off. ....... | H04N 5/445 |
| 0774866 | 5/1997 | European Pat. Off. ......... | H04N 5/44 |
| 0836321 | 4/1998 | European Pat. Off. ....... | H04N 7/088 |

*Primary Examiner*—Andrew I. Faile
*Assistant Examiner*—Reuben M. Brown
*Attorney, Agent, or Firm*—Joseph S. Tripoli; Peter M. Emanuel; Frank Y. Liao

[57] ABSTRACT

An Electronic Program Guide (EPG) system is disclosed which accommodates a mix of high definition television (HDTV) and standard definition television (SDTV) EPG display formats. Viewers can toggle from cell to cell of an EPG display using a navigation system such as a remote control highlighting programs of interest. Channels which show a mix of HDTV and SDTV programming have the cells of the grid remain separate for the time period of SDTV programming but join those cells into a single cell when an HDTV program is to be aired.

10 Claims, 3 Drawing Sheets

| PROGRAM GUIDE | | | | |
|---|---|---|---|---|
| CHANNEL | 1:00 | 1:30 | 2:00 | 2:30 |
| 104 | ROSEANNE | HOME IM... | BAYWATCH | |
| 105A | SEINFELD | TERMINATOR 2: JUDGEMENT DAY | | |
| 105B | FRIENDS | | | |
| 105C | MURPHY... | | | |
| 105D | ALL IN THE ... | | | |
| 106 | COPS | MIAMI VICE | | STAR TREK |

FIG. 4

| PROGRAM GUIDE | | | | |
|---|---|---|---|---|
| CHANNEL | 1:00 | 1:30 | 2:00 | 2:30 |
| 104 | ROSEANNE | HOME IM... | BAYWATCH | |
| 105A | SEINFELD | TERMINATOR 2: JUDGEMENT DAY | | |
| 105B | FRIENDS | TERMINATOR 2: JUDGEMENT DAY | | |
| 105C | MURPHY... | TERMINATOR 2: JUDGEMENT DAY | | |
| 105D | ALL IN THE ... | TERMINATOR 2: JUDGEMENT DAY | | |
| 106 | COPS | MIAMI VICE | | STAR TREK |

FIG. 5

HD TO SD GUIDE CONVERTER FOR ELECTRONIC TELEVISION SCHEDULE SYSTEM

FIELD OF THE INVENTION

This invention relates to electronic program guide data for television systems in general and, in particular, the ability to compensate for a mixture of multiple channel high definition television (HDTV) program data and single channel standard definition television (SDTV) program data on a display screen.

BACKGROUND

An Electronic Program Guide (EPG) is an interactive, on-screen analog to TV listings found in local newspapers or other print media. The information contained in an EPG includes programming characteristics such as channel number, program title, start time, end time, elapsed time, time remaining, rating (if available), topic, theme, and a brief description of the program's content. EPGs are usually arranged in a two-dimensional table or grid format with time on one axis and channel numbers on the other axis. Unlike non-interactive guides that reside on a dedicated channel and merely scroll through the current programming on the other channels, EPGs allow viewers to select any channel at any time up to seven days forward. Further EPG features include the ability to highlight individual cells of the grid containing program information. Once highlighted the viewer can perform functions pertaining to that selected program. For instance, the viewer could instantly switch to that program if it is currently being aired. Viewers could also set up one touch video cassette recording (VCR) or the like if the television is properly configured and connected to a recording device.

Such EPGs are known in the art and described, for instance, in U.S. Pat. Nos. 5,353,121, 5,479,268, and 5,479,266 issued to Young et al. and assigned to StarSight Telecast, Inc. These patents are directed to television scheduling systems, or EPGs, in which a television display can be brought up by a viewer showing channel offerings in a table format. The cells of the table which form the columns and rows are irregular in length (row dimension) because not every program spans the same amount of time while the columns are regular in height. Typically, programs are broken down into ½ hour increments and a single program can last in excess of two hours. This is illustrated in FIG. 1 of U.S. Pat. No. 5,353,121 in which "Perfect Strangers" spans from 11:00 AM to 11:30 AM while in the row below "Sesame Street" spans the length of the grid covering in excess of 1½ hours.

EPGs have been used extensively in digital systems such as Thomson DSS™ and StarSight™. Up to this point such systems only display channels which are static, i.e., channels with unchanging formats. However, dynamic or changing channel formats are forthcoming and a system to accommodate these dynamic formats will be required. With the advent and proliferation of digital television, each broadcaster will likely be allotted a specific bandwidth within which the broadcaster can provide programs in multiple formats. For example, a broadcaster can utilize the bandwidth to air a program in a first format such as high definition television (HDTV) or in a second format such as standard definition television (SDTV). Because the bandwidth required for HDTV signals is greater than for SDTV signals, the bandwidth allocated for a typical channel can accommodate one HDTV program or a plurality of SDTV programs.

A single HDTV program will provide higher resolution picture quality to the viewer, but multiple SDTV programs allow the broadcaster to achieve greater revenue from advertisers since the bandwidth can be split among several programs instead of just one. One possible scenario would consist of a mix of HDTV and SDTV throughout the day for any given broadcaster. For instance, movies are more likely to be broadcast as HDTV in order to provide the viewer with a high quality product while talk shows, for instance, can be broadcast in SDTV with no appreciable reduction in quality.

A need exists for an EPG system that can display the proper program data for a channel providing multiple format programming without causing viewer confusion whether the channel is providing one program in one format or a plurality of programs in another format.

SUMMARY OF THE INVENTION

The present invention solves the above described problem of providing an EPG system for clearly depicting programming aired in a mix of first and second programming formats. Viewers can toggle from cell to cell of the EPG display using a navigation system such as a remote control highlighting programs of interest. The EPG display grid represents a plurality of programs that are aired simultaneously on a single channel in a first format by a plurality of cells, one for each program. The plurality of cells are joined into a single cell for representing a single program aired in a second format.

Another aspect of the invention involves a method for representing programs in both first and second formats, such as high definition television (HDTV) programs and standard definition television (SDTV) programs, on an electronic program guide (EPG) system. The EPG is comprised of a set of cells arranged in a two-dimensional grid format in which one axis represents time and the other axis represents a channel designator. Each cell contains program data wherein programs in a first format, such as SDTV, occupy a single channel designator while programs in a second format, such as HDTV, occupy multiple channel designators.

The method comprises the steps of enabling the electronic program guide to access program data in the EPG database; determining whether a program resides on a digital channel; determining whether the program requires a plurality of channel designator cells; joining the plurality of channel designator cells to form one cell such that the EPG display includes a single cell for a program independent of the number of channel designators required for the program.

Another aspect of the invention involves repeating the above mentioned steps for each program in the EPG database; and constructing a two-dimensional grid EPG display showing each program in a single cell independent of the format of the program.

Another aspect of the invention involves a system and method for providing an EPG for displaying program data associated with both HDTV and SDTV programs. The EPG comprises a set of cells arranged in a two dimensional grid format having one axis representing time and a second axis representing a channel designator. Each cell contains program data. SDTV programs are represented by a single cell corresponding to a single channel designator. HDTV programs are represented by a single cell corresponding to multiple channel designtors.

BRIEF DESCRIPTION OF THE DRAWING

The foregoing and further features of the invention are illustrated in the accompanying drawings in which:

FIG. 4 is a sample EPG display showing the program "Miami Vice" highlighted.

FIG. 5 is a sample EPG display showing an alternative in which HDTV programs are repeated in each channel designator.

DETAILED DESCRIPTION

HDTV to SDTV programming transitions occur in real-time when digital channels are broadcast. As a result, the same bandwidth occupied by an HDTV channel can be occupied by four or more SDTV channels. A system that can seamlessly display such transitions in an EPG is required and presented herein.

One solution to the above described problem is shown in FIG. 5 where all of the "105" channels display the message "Terminator 2: Judgment Day" from 1:30 through 2:30 and beyond. Prior to that time period the broadcaster had partitioned the bandwidth into four separate channels (105A, 105B, 105C, 105D) in which four separate programs aired from 1:00 to 1:30. When "Terminator 2: Judgment Day" begins in HDTV mode all four channel displays remain separate each bearing the same "Terminator 2: Judgment Day" display. The movie is not being aired on four channels. Rather, it is being aired on a single channel that occupies the bandwidth of the four previous channels. This is somewhat confusing to the viewer.

Figures 1, 2, 3:
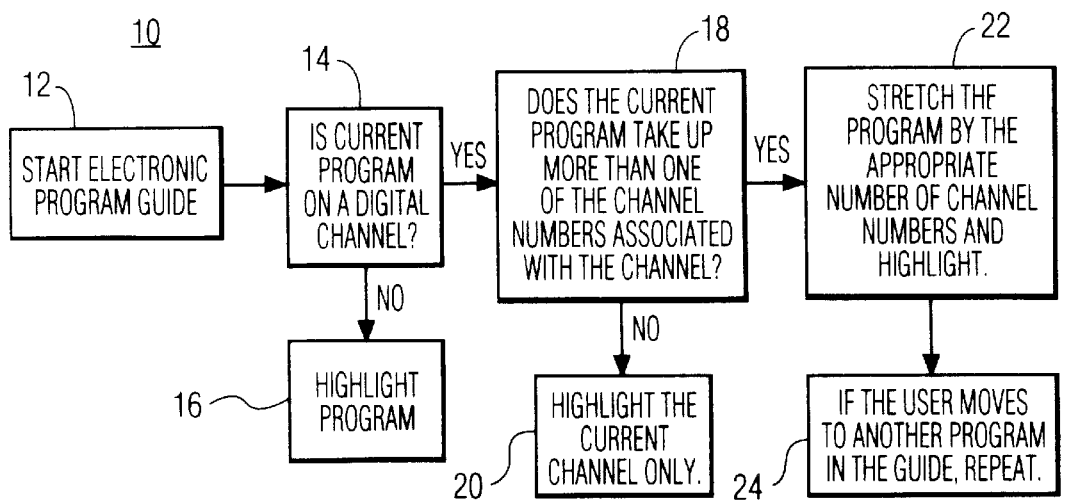
FIG. 1 is a flow diagram of the major block components of the system.
FIG. 2 is a sample EPG display showing the program "Seinfeld" highlighted.
FIG. 3 is a sample EPG display showing the program "Terminator 2: Judgment Day" highlighted.

In accordance with principles of the invention, another solution is shown in FIGS. 1–4. FIG. 1 is a flow diagram illustrating the operation of a system embodying principles of the present invention. The first step is to initiate the EPG 12 for the digital television system. Next, it is determined 14 whether the current program resides on a digital channel based on the information contained in the EPG. If the result is no then the program is immediately highlighted 16. If the result is yes then it is determined 18 whether the current program occupies more than one of the channel numbers associated with the channel. If the result to this query is no then the current channel number only is highlighted 20. If the result is yes then the program is stretched 22, i.e. cells are joined, by the appropriate number of channel numbers which are then highlighted. The system then waits for the viewer to toggle to a different program and repeats 24 the process.

The present invention is best described with reference to the following example. Referring to FIG. 2 the viewer is currently watching "Seinfeld" on channel 105A. By pressing the appropriate key on a keypad entry system, such as a remote control, the EPG display is shown with "Seinfeld" highlighted. When the viewer presses the right arrow key or its equivalent the EPG display changes to that shown in FIG. 3 and "Terminator 2: Judgment Day" is now highlighted. Note that all four channels (105A, 105B, 105C, 105D) are highlighted because the movie is being broadcast on HDTV and using all of the available bandwidth reserved for channel 105. When the viewer next presses the down arrow key "Miami Vice" is highlighted in SDTV format as shown in FIG. 4. It should be appreciated that the viewer did not have to depress the down arrow key four times to get to "Miami Vice".

Figure 6:
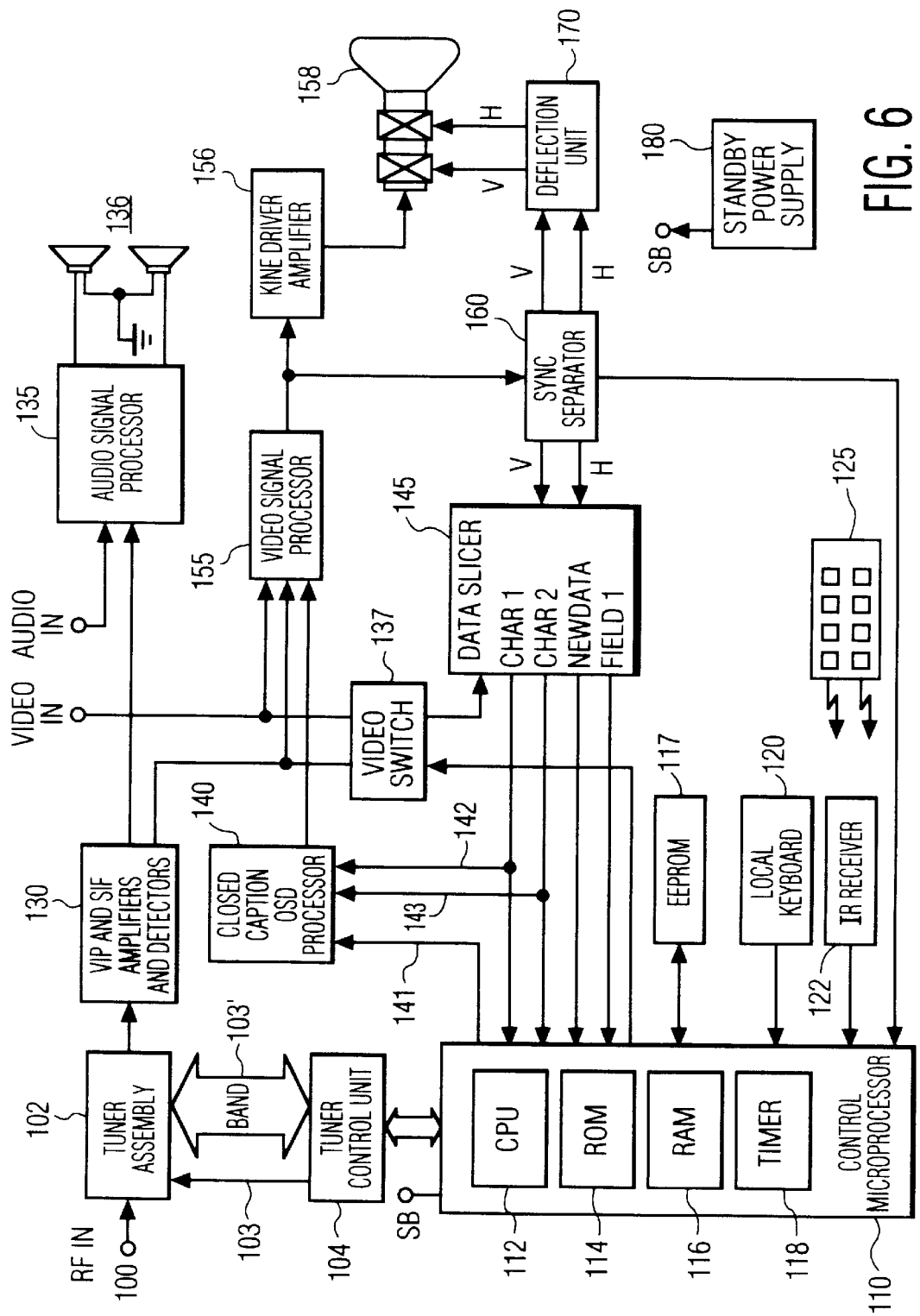
FIG. 6 illustrates a television receiver suitable for use with the invention.

FIG. 6 illustrates a television receiver capable of implementing the invention as described above. Referring to FIG. 6, a television receiver includes an RF input terminal 100 which receives radio frequency (RF) signals and applies them to a tuner assembly 102. Tuner assembly 102 selects and amplifies a particular RF signal under control of a tuner controller 104 which provides a tuning voltage via a wire 103, and bandswitching signals via signal lines represented by the broad double-ended arrow 103, to tuner assembly 102.

Tuner assembly 102 converts the received RF signal to an intermediate frequency (IF) signal and provides an IF output signal to video (VIF) and sound (SIF) amplifier and detector unit 130. VIF/SIF amplifier and detector unit 130 amplifies the IF signal applied to its input terminal and detects the video and audio information contained therein. The detected video information is applied as one input of a video processor unit 155. The detected audio signal is applied to an audio processor 135 for processing and amplification before being applied to a speaker assembly 136.

Tuner controller 104 generates the tuning voltage and bandswitching signals in response to control signals applied from a system control microcomputer ($\mu$C) 110. The terms "Microcomputer", "controller", and "microprocessor", as used herein, are equivalent. It is also recognized that the control function of microcomputer 110 may be performed by an integrated circuit especially manufactured for that specific purpose (i.e., a "custom chip"), and the term "controller", as used herein, is also intended to include such a device. Microcomputer 110 receives user-initiated commands from an infrared (IR) receiver 122 and from a "local" keyboard 120 mounted on the television receiver itself. IR receiver 122 receives IR transmissions from remote control transmitter 125. Microcomputer 110 includes a central processing unit (CPU) 112, a program memory (ROM) 114, and stores channel related data in a random access memory (RAM) 116. RAM 116 may be either internal to, or external to, microprocessor 110, and may be either the volatile or nonvolatile type. The term "RAM" is also intended to include electrically erasable programmable read only memory (EEPROM) 117. One skilled in the art will recognize that if volatile memory is utilized, that it may be desirable to use a suitable form of standby power (such as from STANDBY POWER SUPPLY 180) to preserve its contents when the receiver is turned off.

Microcomputer 110 also includes a timer 118 for providing timing signals as needed. Microcomputer (or controller) 110 generates a control signal for causing tuner control unit 104 to control tuner 102 to select a particular RF signal, in response to user-entered control signals from local keyboard 120 and from infrared (IR) receiver 122. IR receiver 122 is powered from Standby Power Supply 180 to be able to receive a command to turn on the receiver.

Tuner 102 produces a signal at an intermediate frequency (IF) and applies it to a processing unit 130 comprising a video IF (VIF) amplifying stage, an AFT circuit, a video detector, and a sound IF (SIF) amplifying stage. Processing unit 130 produces a first baseband composite video signal (TV), and a sound carrier signal. The sound carrier signal is applied to an audio signal processing unit 135 which includes an audio detector and may include a stereo decoder. Audio signal processor unit 135 produces a first baseband audio signal and applies it to a speaker unit 136. Second baseband composite video signals and second baseband audio signals may be applied to VIDEO IN and AUDIO IN terminals from an external source.

The first and second baseband video signals (TV) are coupled to a video processor unit 155 (having a selection circuit not shown). Electrically erasable programmable read only memory (EEPROM) 117 is coupled to controller 110, and serves as a non-volatile storage element for storing auto programming channel data, and user-entered channel data.

The processed video signal at the output of video signal processor unit 155, is applied to a Kine Driver Amplifier 156 for amplification and then applied to the guns of a color picture tube assembly 158 for controlling the deflection of its electron beam.

The television receiver may also include closed caption circuitry as follows. A Data Slicer 145 receives closed caption data at a first input from VIF/SIF amplifier and detector unit 130, and at a second input from the VIDEO IN terminal via a Video Switch 137 which selects the proper source of closed caption data under control of controller 110. Data Slicer 145 supplies closed caption data to Closed Caption OSD Processor 140 via lines 142 and 143. Data Slicer 145 supplies closed caption status data (Newdata, Field1) to controller 110. Under control of controller 110, via control line 141, Closed Caption OSD Processor 140 generates character signals, and applies them to an input of video signal processor 155, for inclusion in the processed video signal. Alternatively, Closed Caption OSD Processor 140 and Data Slicer 145 may be included in controller 110.

System control microcomputer (μC) 110 controls and operates the present invention. Electrically-erasable programmable read only memory (EEPROM) 117 is coupled to microcomputer 110, and serves as a non-volatile storage element for storing auto-programming channel data, and user-entered channel data.

Microcomputer 110, as applied to the present invention, has several functions. First, the microcomputer 110 accesses the stored EPG data to determine whether the current program is on a digital channel. If it is not, the CPU 112 highlights the selection without alteration. If the program does, however, occupy a digital channel a further check is performed by CPU 112 to determine the precise number of channels associated with the program. If it is found that only one channel is required for the current program then the cell corresponding to that program is highlighted within the EPG display. If the program requires multiple channels then the program channel's corresponding cells are joined into a single larger cell by CPU 112 and shown as a single highlighted cell in the EPG display. The foregoing process is repeated each time the user switches to another program.

While the invention has been described with reference to the preferred embodiment thereof, it will be appreciated by those of ordinary skill in the art that various modifications can be made to the structure and function of individual parts of the system without departing from the spirit and scope of the invention as a whole.

I claim:

1. A method for displaying television program data on an electronic program guide (EPG) system; said EPG comprising a plurality of cells arranged in a two-dimensional grid having a first axis representing time and a second axis representing a plurality of channel designators; each cell included in said plurality of cells containing program data; a program in a first format occupying a single channel and a program in a second format occupying a plurality of channels; said method comprising the steps of:
    a) detecting a program exhibiting said second format; and
    b) joining cells of the EPG display representing a plurality of channel designators associated with respective ones of a plurality of channels occupied by said program exhibiting said second format to produce a single cell representing said program exhibiting said second format.

2. The method of claim 1 wherein said first program format comprises SDTV format and said second format comprises HDTV format.

3. A method for displaying high definition television (HDTV) program data and standard definition television (SDTV) program data on an electronic program guide (EPG) system stored within a television, said EPG comprised of a set of cells arranged in a two-dimensional grid format in which one axis represents time and the other axis represents a channel designator each cell containing program data wherein SDTV programs occupy a single channel designator while HDTV programs occupy multiple channel designators, said method comprising the steps of:
    a) enabling the electronic program guide to access the program data in the EPG database;
    b) determining whether a program resides on a digital channel;
    c) determining whether the program is an HDTV program requiring more than one channel designator;
    d) determining how many channel designator cells the program requires;
    e) joining the cells on the EPG display of the channel numbers that are required by the program into a single program cell;
    f) repeating steps a) through e) for each program in the EPG database; and
    g) constructing the two-dimensional grid EPG display showing each program in a single cell regardless of how many channel designators are required for a given program.

4. The method of claim 3 wherein a keypad entry device is used to navigate the grid of the EPG display.

5. The method of claim 4 wherein the keypad entry device is a remote control unit.

6. The method of claim 4 wherein a viewer uses up, down, right, and left arrow keys or their equivalent to navigate from one program to another in the EPG display.

7. A system for displaying a mix of high definition television (HDTV) program data and standard definition television (SDTV) program data on an electronic program guide (EPG) system within a television, said EPG having a display comprised of a set of cells arranged in a two-dimensional grid format in which one axis represents time and the other axis represents a channel designator each cell containing program data wherein SDTV programs occupy a single channel designator while HDTV programs occupy multiple channel designators, said system comprising:
    a signal processor for generating an output signal suitable for coupling to a display device for displaying said EPG; and
    a memory unit coupled to said signal processor for storing EPG data;
    said signal processor accessing said stored EPG data for detecting a program occupying a plurality of channels;
    said signal processor generating said output signal such that said EPG display includes a single cell occupying an area of said EPG corresponding to a plurality of channel designators corresponding to said plurality of channels occupied by said channel;
    said single cell including program data for said program occupying said plurality of channels.

8. The system of claim 7 wherein a keypad entry device is used to navigate the grid of the EPG display.

9. The system of claim 8 wherein the keypad entry device is a remote control unit.

10. The system of claim 9 wherein a viewer uses up, down, right, and left arrow keys or their equivalent to navigate from one program to another in the EPG display.

* * * * *